(12) United States Patent
Chen

(10) Patent No.: US 7,701,507 B2
(45) Date of Patent: Apr. 20, 2010

(54) DIGITAL CAMERA MODULE HAVING LINEAR VOICE COIL ACTUATOR

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 929 days.

(21) Appl. No.: 11/474,171

(22) Filed: Jun. 23, 2006

(65) Prior Publication Data

US 2007/0097218 A1    May 3, 2007

(30) Foreign Application Priority Data

Oct. 28, 2005    (CN) .................. 2005 1 0100813

(51) Int. Cl.
    *H04N 5/225* (2006.01)
(52) U.S. Cl. .................. 348/374; 348/294; 348/373; 381/398; 381/400; 381/401; 381/409; 381/412
(58) Field of Classification Search .............. 348/218.1, 348/208.2, 208.4, 294, 373, 374; 381/396
    See application file for complete search history.

(56) References Cited

U.S. PATENT DOCUMENTS

| | | | |
|---|---|---|---|
| 5,999,746 A | | 12/1999 | Kitagawa |
| 6,686,954 B1 * | | 2/2004 | Kitaguchi et al. ........ 348/208.1 |
| 6,781,622 B1 * | | 8/2004 | Sato et al. ................ 348/208.4 |
| 6,930,708 B1 * | | 8/2005 | Sato et al. .............. 348/208.99 |
| 6,992,700 B1 * | | 1/2006 | Sato et al. ................ 348/208.2 |
| 2006/0125950 A1 * | | 6/2006 | Chen .......................... 348/345 |
| 2006/0127072 A1 * | | 6/2006 | Seo ............................. 396/55 |
| 2006/0132613 A1 * | | 6/2006 | Shin et al. ................ 348/208.7 |
| 2006/0170782 A1 * | | 8/2006 | Stavely .................... 348/208.6 |
| 2006/0197865 A1 * | | 9/2006 | Birecki et al. ............... 348/345 |
| 2007/0047942 A1 * | | 3/2007 | Chang et al. ................ 396/133 |

FOREIGN PATENT DOCUMENTS

| | | |
|---|---|---|
| JP | 9-18771 | 1/1997 |
| KR | 20020081005 A | 10/2002 |
| TW | 239432 | 9/2005 |

* cited by examiner

*Primary Examiner*—Jason Chan
*Assistant Examiner*—Usman Khan
(74) *Attorney, Agent, or Firm*—Clifford O. Chi

(57) ABSTRACT

A digital camera module (100) includes a lens module (110), an image sensor (120) and a linear voice coil actuator (130). The lens module further includes a lens set (111), an infrared cut filter (112), a spacer set (113) and a barrel (114). The image sensor is a CCD or a CMOS. The linear voice coil actuator includes an elongated soft magnetic core (131), a tubular permanent magnet (132) positioned parallel to the axis of the core, a sliding holder (133) and a coil (134) attached to the sliding holder and positioned to interact with the permanent magnet along the axis of the core. The digital camera module further includes a servo-controller (140) for controlling the movement of the linear voice coil actuator.

20 Claims, 5 Drawing Sheets

DIGITAL CAMERA MODULE HAVING LINEAR VOICE COIL ACTUATOR

TECHNICAL FIELD

The invention relates generally to digital camera modules, and more particularly, to an image pickup module for digital camera having auto-focus and zoom mechanism.

DISCUSSION OF RELATED ART

The use of digital cameras has increased greatly over the past few years. With the development of wireless communication technologies many mobile phones or Personal Digital Assistants (PDAs) now mount digital cameras. Generally, digital cameras are image recording media capable of photographing a plurality of still images without using films. Such a digital camera uses an image pickup device, which is a kind of semiconductor device, such as a charged coupled device (CCD) or complementary metal oxide semiconductor (CMOS). In the digital camera, an object image formed on the image pickup device through a lens is converted into an electrical signal by the image pickup device, and the electrical signal is stored as a digital signal in a mobile phone or PDA in which the digital camera is mounted.

Most automatic cameras include a device for automatically focusing a subject to be photographed. An auto-focus device does not require the user to manually bring the subject into focus, thereby reducing focusing errors and making modern automatic cameras more easy to use. A typical auto-focus device is controlled by a microcontroller to control the relative position of a pair of lenses. The microcontroller also coordinates other devices to perform an active range finding function (e.g. infrared) or a passive range finding function. Once the range of the subject from the camera is determined the microcontroller controls the auto-focus device to position the lenses to correctly focus the subject.

Since the digital camera for image pickup devices are intended for mounting in small mobile phones or PDAs, technologies for miniaturization of digital camera components are key to a successful product. Cost effective automatic cameras usually employ a two-position lens system where the lens system can be set to either a far-focus or a near-focus position. A simplified range finding system provides ranging information to a microcontroller that controls the two positional lens system. Focus is then automatically established based on the subject being at infinity or at a normal subject distance of about 8-12 feet (2.4-3.6 meters).

The digital camera industry, like other technological industries, is constantly striving to reduce the size of products, while maintaining or increasing the product's functionality. Conventional image pickup modules for digital cameras do not use space economically and have overly complicated linkage mechanisms and other unnecessary components.

What is needed, therefore, is a digital camera module having an auto-focus and zoom mechanism, and which could function to reduce size, weight, and costs of modern automatic cameras.

SUMMARY

The present invention provides a digital camera module having an auto-focus and zoom mechanism. In one embodiment, the digital camera module includes a lens module, an image sensor and a linear voice coil actuator. The lens module is configured for transmitting images. The lens module further includes a lens set, an infrared cut filter, a spacer set and a barrel receiving the lens set and the infrared cut filter therein. The lens set includes at least a glass aspherical lens and at least a plastic aspherical lens. The image sensor is a charged coupled device (CCD) or a complementary metal oxide semiconductor (CMOS).

The linear voice coil actuator includes an elongated soft magnetic core, a tubular permanent magnet, a coil and a sliding holder. The tubular permanent magnet receives the elongated soft magnetic core therein. The coil surrounds and is moveable relative to the elongated soft magnetic core. The sliding holder has a fixing portion, a driving portion and a connecting portion. The fixing portion is received in the tubular permanent magnet and coupled to the coil. The driving portion is configured for driving the image sensor to move. The connecting portion interconnects the fixing portion and the driving portion. The digital camera module further includes a servo-controller for controlling the action of the linear actuator.

Advantages and novel features of the present digital camera module will become more apparent from the following detailed description of preferred embodiments when taken in conjunction with the accompanying drawings.

BRIEF DESCRIPTION OF THE DRAWINGS

Many aspects of the present digital camera module can be better understood with reference to the following drawings. The components in the drawings are not necessarily drawn to scale, the emphasis instead being placed upon clearly illustrating the principles of the present invention.

Figure 1:
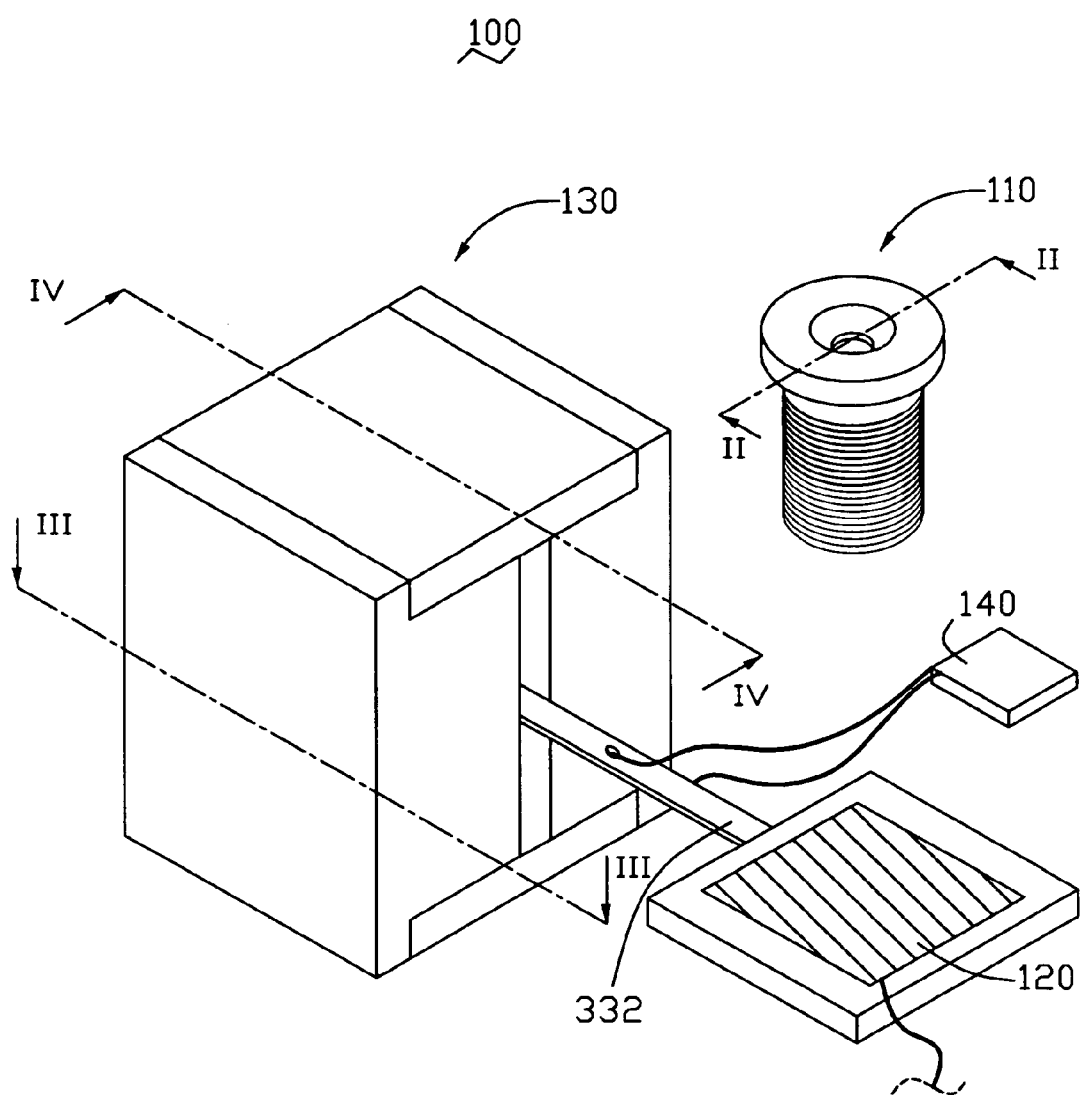
FIG. 1 is a schematic, isometric view of a digital camera module in accordance with a first preferred embodiment.

Corresponding reference characters indicate corresponding parts throughout the several views. The exemplifications set out herein illustrate at least one preferred embodiment of the present digital camera module, in one form, and such exemplifications are not to be construed as limiting the scope of the invention in any manner.

DETAILED DESCRIPTION OF PREFERRED EMBODIMENTS

Reference will now be made to the drawings to describe embodiments of the present digital camera module in detail.

Referring to FIG. 1, a digital camera module 100 according to a first preferred embodiment is shown. The digital camera module 100 includes a lens module 110, an image sensor 120 and a linear voice coil actuator 130. The lens module 110 is configured for transmitting an image from outside the digital camera module 100. The image sensor 120 is configured for receiving the image transmitted from the lens module and converting the image from a light signal form into an electronic signal form. The image sensor 120 is connected to the linear voice coil actuator 130. The linear actuator 130 is adapted to drive the image sensor 120 nearer to or further away from the lens module 110 for realization of auto-focus and zoom function. The linear voice coil linear voice coil actuator 130 is controlled by a servo-controller 140.

Figure 2:
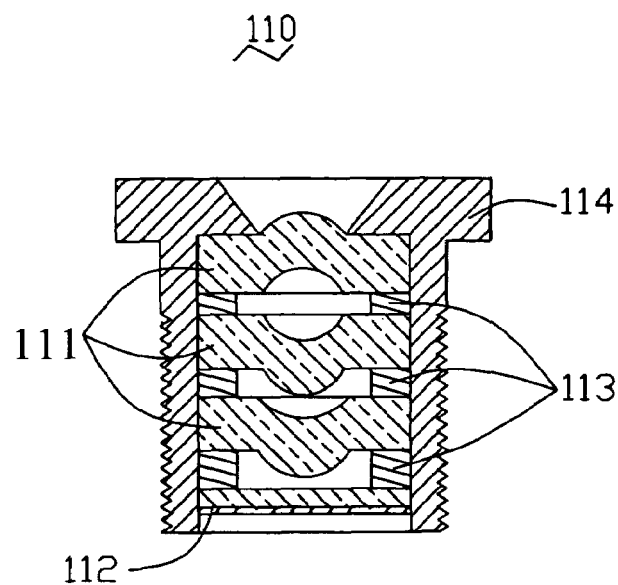
FIG. 2 is a schematic, cross-sectional view of a lens module of the digital camera module of FIG. 1, taken along line II-II.

Referring to FIG. 2, the lens module 110 includes a lens set 1 11, an infrared cut filter 112, a spacer set 113 and a barrel 114. The lens set 111 includes a group of aspheric lenses. The aspheric lens is selected from a group consisting of a glass aspheric lens (G) and a plastic aspheric lens (P). The hybrid combination of the lens set 111 can be 1G2P, 3P, 2G1P, 3G or more lenses. Resolution of the lens set 111 can be 1.3 mega pixels, 2 mega pixels, 3 mega pixels, 4 mega pixels, 5 mega pixels, 6 mega pixels or more. Resolution of more than 3 mega pixels requires four aspheric lenses. All surfaces of the lens set 111 have an anti-reflective coating. A spacer set 113 is placed between each lens of the lens set 111 and its neighboring lenses. The infrared cut filter 112 is placed between the lens set 111 and the image sensor 112. The lens set 111, the spacer set 113 and the infrared cut filter 112 are accommodated and fixed in the barrel 114.

An image is shone from the outer of the digital camera module 100 into the lens module 110, and received by the image sensor 120 for converting the image into electrical signals. A ¼ inch complementary metal oxide semiconductor (CMOS) sensor is used as the image sensor 120. The lens module 110 is designed to be suitable for a device equipped with a ¼ inch CMOS sensor. Alternatively, the image sensor 120 can be a charged coupled device (CCD).

Figure 3:
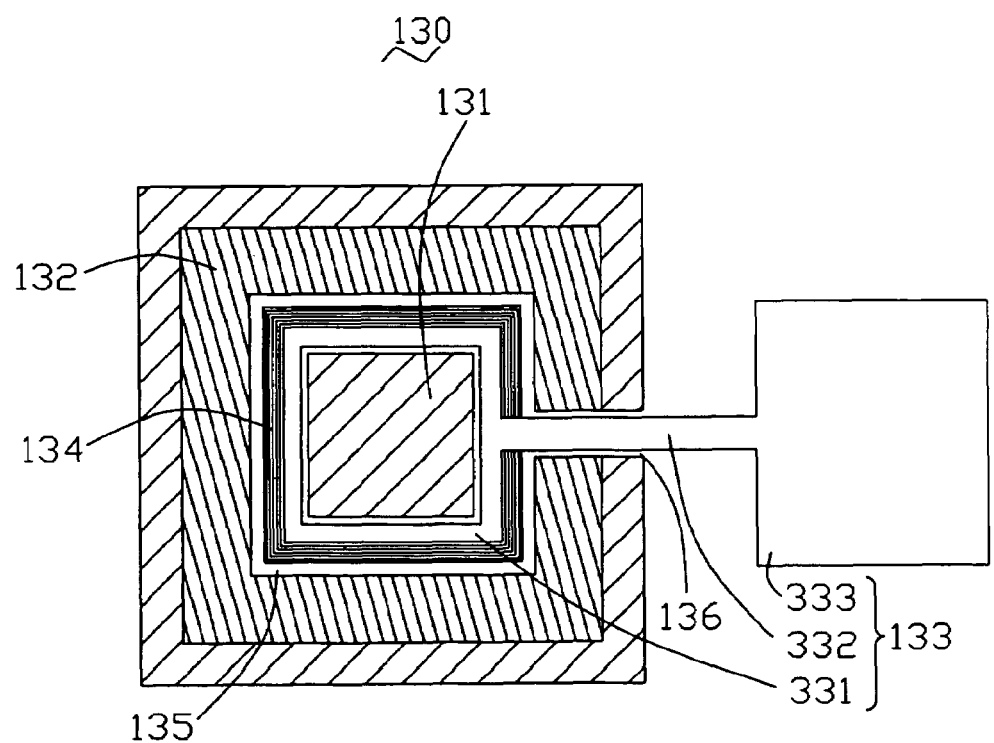
FIG. 3 is a schematic, horizontal cross-sectional view of a linear voice coil actuator of the digital module of FIG. 1, taken along line III-III.
Figure 4:
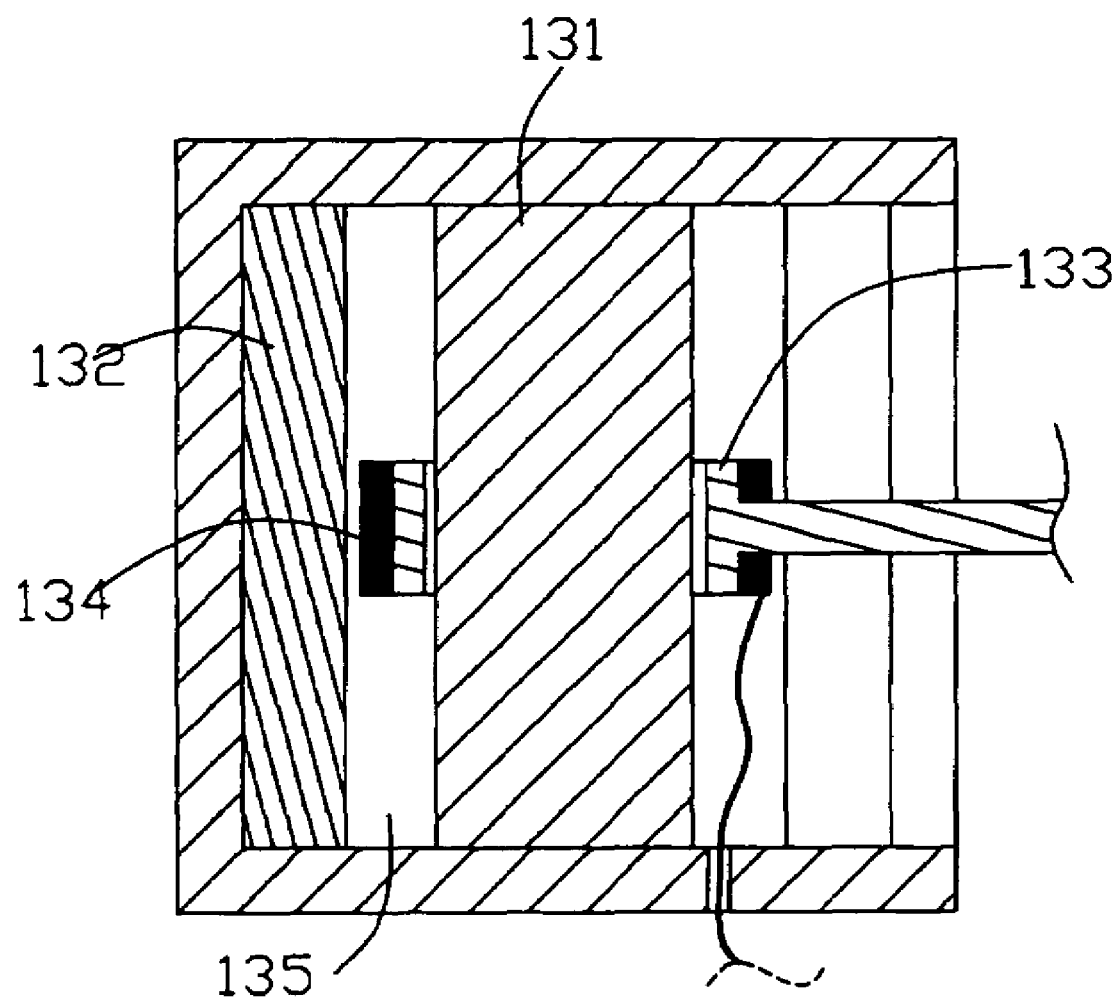
FIG. 4 is a schematic, vertical cross-sectional view of a linear voice coil actuator of the digital module of FIG. 1, taken along line IV-IV.

Referring to FIGS. 3 and 4, the linear voice coil actuator 130 includes an elongated soft magnetic core 131 having a longitudinal axis; a tubular permanent magnet 132 positioned parallel to the longitudinal axis of the core 131; a sliding holder 133; and a coil 134 attached to the sliding holder 133 and positioned to interact with the tubular permanent magnet 132 along the axis of the core 131. The tubular permanent magnet 132 receives the core 131 therein. The coil 134 is surrounded and moveable relative to the core 131. The sliding holder 133 has a fixing portion 331, a driving portion 333 and a connecting portion 332. The fixing portion 331 is received in the tubular permanent magnet 132, between the core 131 and the permanent magnet 132, and coupled to the coil 134. The driving portion 333 is configured for driving the image sensor 120 to move. The connecting portion 332 interconnects the fixing portion 331 with the driving portion 333. The tubular permanent magnet 132 is positioned with respect to the core 131 in a manner so as to define a cavity 135 between the core 131 and the permanent magnet 132. The fixing portion 331 of the sliding holder 133 is positioned in the cavity 135. The sliding holder 133 is capable of moving along the axis of the core 131 by a magneto-motive force.

The tubular permanent magnet 132 has a slit 136 configured for allowing the connecting portion 332 to extend therethrough and to be slidable therein. The image sensor 120 is attached to the driving portion 333 of the sliding holder 133 and is arranged outside the tubular permanent magnet 132. Referring to FIG. 1, the servo-controller 140 for controlling the voice coil actuator 130 includes a sensor (not shown) connected with the image sensor 120 for monitoring a linear position of the image sensor 120. By controlling the magneto-motive force (MMF) in the moving coil 134, a camera user is able to control the characteristics of the linear voice coil actuator 130, for example constant force across the stroke, or other desired performance characteristics. The step resolution of the linear voice coil actuator 130 may be thereby configured in a range of 0.01 micrometers to 0.02 micrometers.

Figure 5:
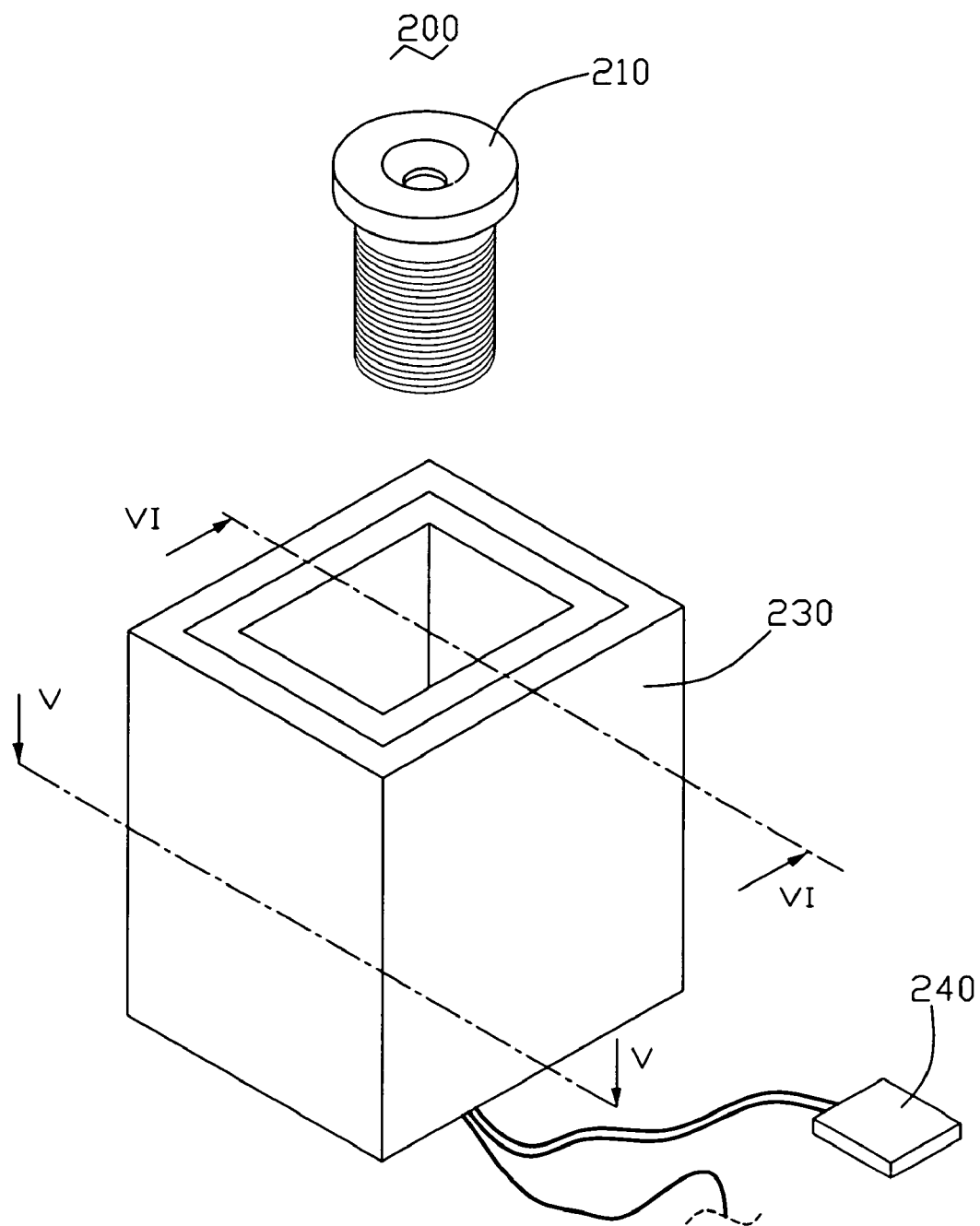
FIG. 5 is a schematic, isometric view of a digital camera module in accordance with a second preferred embodiment.
Figure 6:
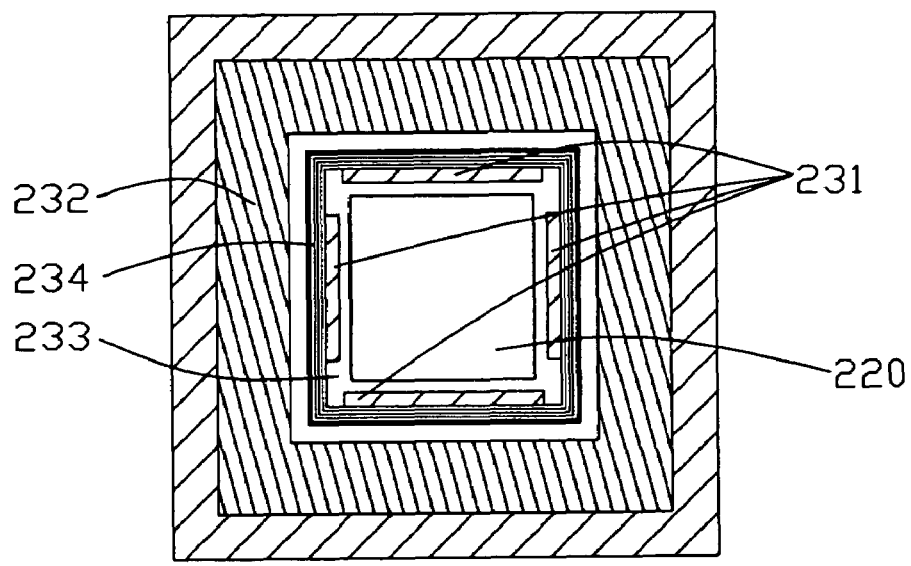
FIG. 6 is a schematic, horizontal cross-sectional view of a linear voice coil actuator of the digital module of FIG. 5, taken along line V-V.
Figure 7:
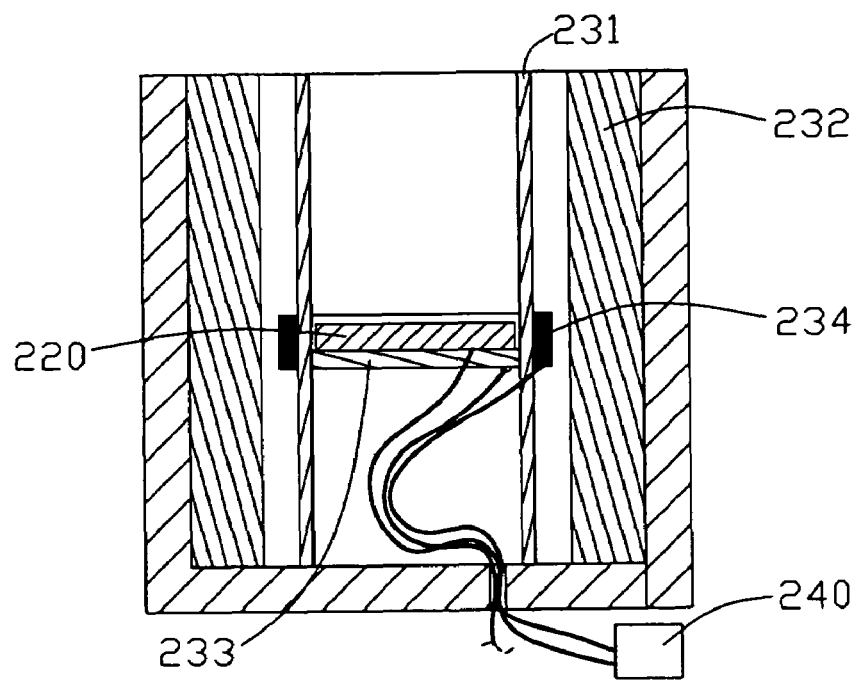
FIG. 7 is a schematic, vertical cross-sectional view of a linear voice coil actuator of the digital module of FIG. 6, taken along line VI-VI.

Referring to FIGS. 5 to 7, a digital camera module 200 according to a second preferred embodiment is shown. The digital camera module 200 includes a lens module 210, an image sensor 220 and a linear voice coil actuator 230. The lens module 210 is the same as the above described lens module 110. The image sensor 220 is configured for receiving the image transmitted from the lens module and converting the image from a light signal form into an electronic signal form. The image sensor 220 is placed in the linear voice coil actuator 230. A ¼ inch CMOS sensor generally used in mobile phones is used as the image sensor 220. The lens module 210 is designed to be suitable for the specification of a device equipped with the ¼ inch CMOS sensor. The image sensor 220 also can be a CCD.

The linear voice coil actuator 230 can drive the image sensor 220 closer to or further away from the lens module 210 thus enabling auto-focus and zoom functions. The linear voice coil actuator 230 is controlled by a servo-controller 240. Referring to FIG. 6 and FIG. 7, the linear voice coil actuator 230 includes an elongated soft magnetic core set 231 having an axis; a tubular permanent magnet 232 positioned parallel to the axis of the elongated soft magnetic core set 231; a sliding holder 233; and a coil 234 attached to the sliding holder 233 and positioned to interact with the tubular permanent magnet 232 along the axis of the core 231.

The core set 231 is an assembly of four separating plates. The permanent magnet 232 is positioned with respect to the core set 231. The sliding holder 233 is positioned in the middle of the permanent magnet 232 and can be moved along the axis of the core set 231 by a magneto-motive force.

The image sensor 220 is attached to the sliding holder 233 and is arranged in the tubular permanent magnet 232. Referring to FIG. 7, the servo-controller 240 for controlling the voice coil actuator 230 includes a sensor (not shown) that is connected with the image sensor 220 to monitor a linear position of the image sensor 220. By controlling the magneto-motive force (MMF) in the moving coil 234, a camera user is able to control the characteristics of the linear voice coil actuator 230, for example constant force across the stroke, or other desired performance characteristics. The step resolution of the linear voice coil actuator 230 is in a range of 0.01 micrometers to 0.02 micrometers.

The linear voice coil actuators in accordance with the present invention can have a variety of shapes, including a rectangular configuration and a cylindrical configuration. The rectangular embodiments are described in the above-described sections, as an example, it being understood that other shapes are contemplated within the spirit of the present invention. As will be apparent to those skilled in the art, although not shown in the figures, brackets or other linkages can be used to connect the image sensors to the load of the linear voice actuators.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:
1. A digital camera module comprising:
a lens module configured for transmitting an image;
an image sensor configured for receiving the image transmitted from the lens module and converting the image from a light signal form into an electronic signal form; and
a linear voice coil actuator configured for driving the image sensor to move so as to properly receive the image transmitted from the lens module;

wherein the linear voice coil actuator comprises:
an elongated soft magnetic core;
a tubular permanent magnet receiving the elongated soft magnetic core therein;
a coil surrounding and moveable relative to the elongated soft magnetic core; and
a sliding holder having:
a fixing portion received in the tubular permanent magnet and fixedly coupled to the coil,
a driving portion on which the image sensor is attached, the driving portion being configured for driving the image sensor to move, and
a connecting portion interconnecting the fixing portion with the driving portion.

2. The digital camera module as claimed in claim 1, wherein the lens module comprises a lens set, an infrared cut filter, a spacer set, and a barrel receiving the lens set and the infrared cut filter therein.

3. The digital camera module as claimed in claim 2, wherein the lens set comprises at least a glass aspheric lens and at least a plastic aspheric lens.

4. The digital camera module as claimed in claim 3, wherein at least one of the at least a glass aspheric lens and the at least a plastic aspheric lens has an anti-reflective film formed on at least one surface thereof.

5. The digital camera module as claimed in claim 1, wherein the image sensor is a CCD.

6. The digital camera module as claimed in claim 1, wherein the image sensor is a CMOS.

7. The digital camera module as claimed in claim 1, wherein the tubular permanent magnet has a slit configured for allowing the connecting portion to extend therethrough and to be slidable therein.

8. The digital camera module as claimed in claim 1, further comprising a servo-controller for controlling movement of the coil of the linear voice coil actuator.

9. The digital camera module as claimed in claim 1, wherein the image sensor is arranged in the tubular permanent magnet.

10. The digital camera module as claimed in claim 1, wherein the image sensor is arranged outside the tubular permanent magnet.

11. The digital camera module as claimed in claim 1, wherein a step resolution of the linear voice coil actuator is in a range of 0.01 micrometers to 0.02 micrometers.

12. The digital camera module as claimed in claim 10, wherein the permanent magnet has a slit configured for allowing the connecting portion to extend therethrough.

13. A digital camera module comprising:
a lens module configured for transmitting an image;
an image sensor configured for receiving the image transmitted from the lens module and converting the image from a light signal form into an electronic signal form; and
a linear voice coil actuator comprising:
a permanent magnet defining a cavity therein;
an elongated soft magnetic core received in the cavity, the soft magnetic core defining an axis;
a coil surrounding the soft magnetic core, the coil being received in the cavity and positioned to interact with the permanent magnet along the axis of the soft magnetic core; and
a sliding holder fixedly coupled to the coil, the image sensor being attached on the sliding holder, the sliding holder capable of moving along the axis of the soft magnetic core by a magneto-motive force thereby driving the image sensor closer to or further away from the lens module.

14. The digital camera module as claimed in claim 13, wherein the sliding holder comprises a fixing portion, a driving portion and a connecting portion interconnecting the fixing portion and the driving portion, the fixing portion is received in the cavity and fixedly coupled to the coil, and the image sensor is attached on the driving portion.

15. The digital camera module as claimed in claim 14, wherein the driving portion and the image sensor are arranged outside the permanent magnet, and the permanent magnet has a slit through which the connecting portion extends.

16. The digital camera module as claimed in claim 13, wherein the coil is attached to the sliding holder, and the image sensor is arranged in the permanent magnet.

17. The digital camera module as claimed in claim 13, wherein the lens module comprises a lens set, an infrared cut filter, a spacer set, and a barrel receiving the lens set and the infrared cut filter therein.

18. A digital camera module comprising:
a lens module configured for transmitting an image;
an image sensor configured for receiving the image transmitted from the lens module and converting the image from a light signal form into an electronic signal form; and
a linear voice coil actuator comprising:
a permanent magnet defining a cavity therein;
an elongated soft magnetic core set received in the cavity, the soft magnetic core set defining an axis;
a coil surrounding the soft magnetic core set, the coil being received in the cavity and positioned to interact with the permanent magnet along the axis of the soft magnetic core set; and
a sliding holder fixedly coupled to the coil, the image sensor being attached on the sliding holder, the sliding holder capable of moving along the axis of the soft magnetic core set by a magneto-motive force thereby driving the image sensor closer to or further away from the lens module.

19. The digital camera module as claimed in claim 18, wherein the coil is attached to the sliding holder, and the image sensor is arranged in the permanent magnet.

20. The digital camera module as claimed in claim 19, wherein the soft magnetic core set comprises a plurality of separating plates.

* * * * *